(12) United States Patent
Liu

(10) Patent No.: US 11,397,153 B2
(45) Date of Patent: Jul. 26, 2022

(54) APPARATUS AND METHOD FOR GRAY FIELD IMAGING

(71) Applicant: KLA Corporation, Milpitas, CA (US)

(72) Inventor: Xiumei Liu, Fremont, CA (US)

(73) Assignee: KLA Corporation, Milpitas, CA (US)

( * ) Notice: Subject to any disclaimer, the term of this patent is extended or adjusted under 35 U.S.C. 154(b) by 54 days.

(21) Appl. No.: 17/106,046

(22) Filed: Nov. 27, 2020

(65) Prior Publication Data

US 2021/0164916 A1 Jun. 3, 2021

Related U.S. Application Data

(60) Provisional application No. 62/943,170, filed on Dec. 3, 2019.

(51) Int. Cl.
*G01N 21/95* (2006.01)
*G06T 7/00* (2017.01)
*G01N 21/88* (2006.01)

(52) U.S. Cl.
CPC ..... *G01N 21/9501* (2013.01); *G01N 21/8806* (2013.01); *G06T 7/0004* (2013.01); *G06T 2207/30148* (2013.01)

(58) Field of Classification Search
CPC ............ G01N 21/9501; G01N 21/8806; G06T 7/0004; G06T 2207/30148
See application file for complete search history.

(56) References Cited

U.S. PATENT DOCUMENTS

2003/0179370 A1 9/2003 Goldberg et al.
2006/0114453 A1* 6/2006 Goldenshtein ...... G03F 7/70666
356/237.1

FOREIGN PATENT DOCUMENTS

| JP | 2005070477 A | 3/2005 |
| KR | 20120043850 A | 5/2012 |
| KR | 20190014224 A | 2/2019 |

OTHER PUBLICATIONS

WIPO, ISR for PCT/US2020/062759, dated Mar. 23, 2021.

* cited by examiner

*Primary Examiner* — Jamil Ahmed
(74) *Attorney, Agent, or Firm* — Hodgson Russ LLP

(57) ABSTRACT

A beam of light is directed from a light source at a wafer on a chuck. The beam of light is reflected off the wafer toward a 2D imaging camera. Movable focus lenses in the path of the beam of light can independently change the illumination conjugate and the collection conjugate. A structured mask in an illumination path can be used and the beam of light can be directed through apertures in the structured mask. A gray field image of a wafer in a zone without direct illumination is generated using the 2D imaging camera and locations of defects on the wafer can be determined using the gray field image.

18 Claims, 4 Drawing Sheets

APPARATUS AND METHOD FOR GRAY FIELD IMAGING

CROSS-REFERENCE TO RELATED APPLICATIONS

This application claims priority to the provisional patent application filed Dec. 3, 2019 and assigned U.S. App. No. 62/943,170, the disclosure of which is hereby incorporated by reference.

FIELD OF THE DISCLOSURE

This disclosure relates to optical systems for semiconductor wafers.

BACKGROUND OF THE DISCLOSURE

Evolution of the semiconductor manufacturing industry is placing greater demands on yield management and, in particular, on metrology and inspection systems. Critical dimensions continue to shrink, yet the industry needs to decrease time for achieving high-yield, high-value production. Minimizing the total time from detecting a yield problem to fixing it determines the return-on-investment for a semiconductor manufacturer.

Fabricating semiconductor devices, such as logic and memory devices, typically includes processing a semiconductor wafer using a large number of fabrication processes to form various features and multiple levels of the semiconductor devices. For example, lithography is a semiconductor fabrication process that involves transferring a pattern from a reticle to a photoresist arranged on a semiconductor wafer. Additional examples of semiconductor fabrication processes include, but are not limited to, chemical-mechanical polishing (CMP), etch, deposition, and ion implantation. An arrangement of multiple semiconductor devices fabricated on a single semiconductor wafer may be separated into individual semiconductor devices.

Inspection processes are used at various steps during semiconductor manufacturing to detect defects on wafers to promote higher yield in the manufacturing process and, thus, higher profits. Inspection has always been an important part of fabricating semiconductor devices such as integrated circuits (ICs). However, as the dimensions of semiconductor devices decrease, inspection becomes even more important to the successful manufacture of acceptable semiconductor devices because smaller defects can cause the devices to fail. For instance, as the dimensions of semiconductor devices decrease, detection of defects of decreasing size has become necessary because even relatively small defects may cause unwanted yield loss in the semiconductor devices.

However, detecting defects in 3D wafer structures and other advanced semiconductor designs poses challenges. For optical inspection, a bright field (BF) mode results in a strong reflection from a top surface of the wafer. The defect signal can be overwhelmed or limited by a bright wafer pattern. A dark field (DF) mode typically suppressed all wafer patterns in a regular array region, but not for a random pattern because wafer pattern information is lost for nuisance filtering. Without contrast information, it can be difficult to differentiate defects from nuisance.

Therefore, improvements to inspection systems are needed.

BRIEF SUMMARY OF THE DISCLOSURE

A system is provided in a first embodiment. The system includes a light source that generates a beam of light, an objective, a chuck configured to hold a wafer in the path of the beam of light that passes through the objective, a relay lens disposed in a path of the beam of light between the light source and the objective, a tunable illumination aperture disposed in the path of the beam of light between the light source and relay lens, a first tube lens disposed in the path of the beam of light between the relay lens and the objective, a first movable focus lens disposed in the path of the beam of light between the first tube lens and the relay lens, a second movable focus lens disposed in the path of the beam of light between the objective and a 2D imaging camera, a second tube lens disposed in the path of the beam of light between the second movable focus lens and the objective, and the 2D imaging camera configured to receive light reflected from a wafer through the objective. The first movable focus lens and the second movable focus lens are configured to be movable along the path of the beam of light to adjust an illumination conjugate between the light source and the wafer and a collection conjugate between the wafer and the 2D imaging camera. The first movable focus lens and the second movable focus lens are configured to position an illumination focus at, above, or below a surface of the wafer. The 2D imaging camera is configured to generate a gray field image of the wafer.

A structured mask can be disposed in the path of the beam of light between the light source and the objective. The structured mask defines a plurality of apertures that the beam of light passes through. A portion of the beam of light is blocked by the structured mask. For example, the structured mask can be disposed between the light source and the first movable focus lens or between the relay lens and the first movable focus lens.

The structured mask can be configured to tilt relative to the path of the beam of light.

An illumination numerical aperture can be from 0 to 0.9. A collection path numerical aperture can be at least 0.9.

The system can further include a processor in electronic communication with the 2D imaging camera. The processor is configured to identify defects in the gray field image from the 2D imaging camera.

A method is provided in a second embodiment. The method includes directing a beam of light from a light source at a wafer on a chuck. The wafer may include 3D structures. The beam of light is reflected off the wafer to a 2D imaging camera. A first movable focus lens and a second movable focus lens can be adjusted. The first movable focus lens is disposed in a path of the beam of light between the light source and the wafer. The second movable focus lens is disposed between the wafer and the 2D imaging camera. The adjusting includes independent changes to an illumination conjugate between the light source and the wafer and a collection conjugate between the wafer and the 2D imaging camera. An image of the wafer is generated using the 2D imaging camera. The image is a gray field image. A location of a defect on the wafer is determined using the image.

A focus of the beam of light can be below, at, or above a surface of the wafer. The focus of the beam of light can change in depth as the beam of light scans across a surface of the wafer.

The method can further include directing the beam of light through a structured mask disposed in the path of the beam of light between the light source and the first moveable relay lens. The structured mask defines a plurality of apertures. The plurality of apertures form bright zones on a surface of the wafer and regions of the structured mask between the apertures form dark zones on the surface of the wafer.

An illumination numerical aperture can be from 0 to 0.9. A collection path numerical aperture can be at least 0.9.

The adjusting can include changing a position of the first movable focus lens such that the structure mask is focused and light in the bright zones leaks into the dark zones.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Advanced semiconductor devices tend to include 3D structures (DRAM, 3D NAND, Gate All-around). Defects below a device surface of a 3D structure are often hard to detect because the top surface's strong reflection can saturate a sensor and because not enough light reaches the defect location, which can be hundred nanometers to a few microns below the surface. A dark field imaging mode can mitigate the sensor saturation issue by filtering out specular reflection, but dark field imaging also loses the context for nuisance filtering. In addition, dark field imaging is not effective for random patterns.

Embodiments of the apparatus and method disclosed herein use a gray field imaging mode, which is in between bright field and dark field. This imaging mode reduces specular reflection without eliminating specular reflection so that more light is allowed onto a device without sensor saturation. Hence, defect absolute signal is enhanced. The wafer pattern remains and context-based or other advanced nuisance filtering algorithms can be used.

In the embodiments disclosed herein, illumination optics with a high numerical aperture (NA) may be used. Gray field imaging with high resolution for wafer field illumination can be achieved with or with a structured mask pattern. The illumination focus can be independently adjustable to at, above, or below the wafer surface. Collection focus can be optimized for improved defect detection. The gray field imaging can use a structured mask pattern with high resolution for wafer plane illumination, independently adjustable illumination and collection focus, or a combination thereof.

Figure 1:
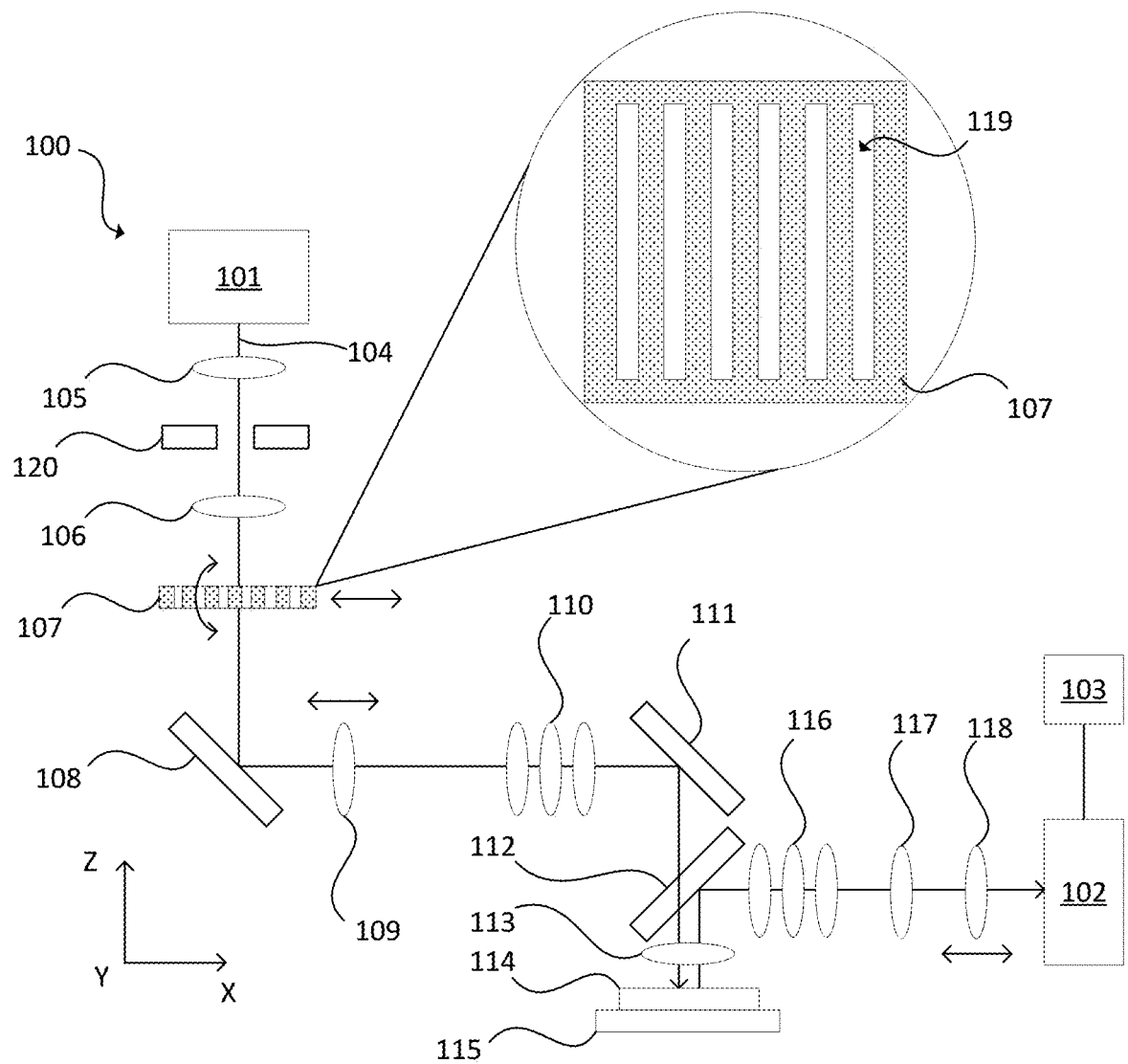
FIG. 1 is a diagram of a system in accordance with the present disclosure.

FIG. 1 is a diagram of a system 100. The structured mask pattern can be imaged onto a surface of the wafer 114 with demagnification. With high resolution and nearly diffraction limited illumination optics, a structured mask pattern can be projected onto a wafer plane with well-defined sharp edges. In general, the system 100 is configured for generating optical-based output for a wafer 114 by directing light to (or scanning light over) and detecting light from the wafer 114. While a wafer 114 is disclosed, a reticle or other workpiece also can be imaged.

Center illumination is illustrated in FIG. 1, but ring-shaped illumination is possible. The aperture shape can vary. An illumination numerical aperture can vary, such as from 0 to 0.9. A collection path numerical aperture can vary, and may be at least 0.9.

A light source 101 generates a beam of light 104. The light source 101 is configured to direct the light to the wafer 114 at one or more angles of incidence, which may include one or more oblique angles and/or one or more normal angles. Conceptually, a gray field can be used for any wavelength range. The optimal wavelength typically depends on wafer stack materials. For instance, if a wafer 3D stack includes substantial amounts of silicon or polysilicon, near-infrared wavelength may be used. In another example, if the wafer material is transparent, then visible wavelengths or deep ultraviolet (DUV) wavelengths may be used for better optical resolution.

In an instance, the light source 101 may include a broad band plasma (BBP) source. In this manner, the light generated by the light source 101 and directed to the wafer 114 may include broadband light. However, the light source 101 may include any other suitable light source such as a laser or light-emitting diode (LED). The laser or LED may include any suitable forms known in the art and the light source 101 may be configured to generate light at any suitable wavelength or wavelengths known in the art. In addition, the light source 101 may be configured to generate light that is monochromatic or nearly-monochromatic. In this manner, the light source 101 may be a narrowband laser. The light source 101 also may include a polychromatic light source that generates light at multiple discrete wavelengths or wavebands.

An objective 113 is positioned proximate a chuck 115 configured to hold a wafer 114 in the path of the beam of light 104. The beam of light 104 passes through the objective 113. For ease of illustration, arrows indicate the path of the beam of light 104.

The system 100 may also include a scanning subsystem configured to cause the beam of light 104 to be scanned over the wafer 114. The scanning subsystem may include any suitable mechanical and/or robotic assembly (that includes chuck 115) that can be configured to move the wafer 114 such that the light can be scanned over the wafer 114. In addition, or alternatively, the system 110 may be configured such that one or more optical elements of the system 100 perform some scanning of the light over the wafer 114. The light may be scanned over the wafer 114 in any suitable fashion, such as in a serpentine-like path or in a spiral path.

An optional lens 105, tunable illumination aperture 120, relay lens 106, optional structured mask 107, first mirror 108, first movable focus lens 109, first tube lens 110 (which illustrates three lenses, but other numbers are possible), and second mirror 111 are disposed in the path of the beam of light 104 between the light source 101 and the objective 113. The illumination path can be from the light source 101 to the wafer 114. The illumination aperture 120 is disposed in the path of the beam of light 104 between the light source 101 and the relay lens 106 or between the optional lens 105 and the relay lens 106. The first tube lens 110 is disposed between the relay lens 106 and the objective 113. The structured mask 107 is disposed between the light source 101 and the first movable focus lens 109. The first movable focus lens 109 is disposed between the first tube lens 110 and the relay lens 106.

The first movable focus lens 109 can be translated (such as using an actuator) along the path of the beam of light 104, which is illustrated with an arrow. The first movable focus lens 109 can adjust to make the structured mask 107 pattern focused relative to a surface of the wafer 114. The motion relationship between first movable focus lens 109 and wafer 114 (e.g., the top surface of the wafer 114) can depend on an implemented optical design, such as illumination numerical aperture, wavelength, and magnification. For instance, for an embodiment the ratio can be 1000:1. In another embodiment the ratio can be 500:1. Wafer 114 motion range in the z direction is typically less than 15 µm. A collection path from the wafer 114 to the camera plane of the 2D imaging camera 102 can form an image of both the wafer 114 and the pattern of the structured mask 107 when it is present.

A third mirror 112, second tube lens 116, zoom lens 117, and second movable focus lens 118 are disposed in the path of the beam of light 104 reflected from the wafer 114 between the objective 113 and the 2D imaging camera 102. The second movable focus lens 118 can be translated (such as using an actuator) along the path of the beam of light 104, which is illustrated with an arrow. The second tube lens 116 is disposed in the path of the beam of light 104 between the second movable focus lens 118 and the objective 113. The motion relationship between the second moveable focus lens 116 and the wafer 114 (e.g., the top surface of the wafer 114) can depend on the implemented optical design form, magnification, numerical aperture, or other variables.

The system 110 may include a number of other refractive and/or reflective optical elements that in combination focus the light from the optical element to the wafer 114. Thus, the system 110 may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the system 110 may be configured to alter one or more of the elements of the illumination subsystem based on the type of illumination to be used for generating the optical based output. For example, an illumination aperture (pupil plane) can take an annular, circular, arc, half-moon, or slit section form at any location of the entire illumination pupil for a suitable illumination angle of incidence target.

The 2D imaging camera 102 is configured to receive light reflected from the wafer 114 through the objective 113. The 2D imaging camera 102 is configured to generate a gray field image of the wafer.

The 2D imaging camera 102 may be any suitable detector known in the art. For example, the 2D imaging camera 102 can be a charge coupled device (CCDs), time delay integration (TDI) camera, or any other suitable detector known in the art. 2D imaging also can be achieved by scanning the wafer 114 or by scanning a 1D or a point detector, which may include a photo diode array, photo-multiplier tube (PMT), or avalanche photo diode (APD). The 2D imaging camera 102 may also include non-imaging detectors or imaging detectors.

The optional structured mask 107 is disposed in the path of the beam of light 104 between the light source 101 and the objective 113. In an instance, the structured mask 107 is disposed in the path of the beam of light 104 between the relay lens 106 and the first movable focus lens 109 or between the relay lens 106 and the first mirror 108. A conjugate image of the structured mask pattern is formed on the wafer plane using the first moveable focus lens 109 to adjust a best focal plane distance from the top surface of the wafer 114.

The structured mask 107 defines apertures 119. These are shown in the top view of the structured mask 107 in the inset of FIG. 1. Light from the beam of light 104 passes through the apertures 119. The regions of the structured mask 107 between the apertures 119 blocks the beam of light 104. A portion of the beam of light 104 can be blocked by the structured mask 107. The structured mask pattern can take a different duty cycle or a different geometry than that illustrated for different application cases. For example, the structured mask 107 can have a checkboard pattern.

A structured mask 107 can be formed by various methods. For instance, a structured mask 107 can be made of chrome-on-glass where the area with chrome pattern blocks light. The structured mask 107 also be cut out of a sheet of metal, graphite, or other materials. The structured mask 107 also can be achieved by optical interference or diffraction phenomena to achieve dark/bright illumination pattern.

A thickness of the feature to define the edge of the structured mask 107 can affect results. For chrome-on-glass, the chrome pattern thickness may be less than 0.5 µm. For a piece of metal, the pattern thickness can be 250 µm.

The distance between the illuminated regions formed using the structured mask 107 also can affect imaging. The width of the apertures 119 may be minimized to affect the gray image, though different applications may use different mask configurations.

As shown in FIG. 1, a structured mask 107 pattern is placed at a plane conjugate to a wafer plane. The pattern geometry can be a 2D grating with half pitch transmitting light while the other half blocks light, though other pitch values are possible. Any duty cycle can be used.

Figure 2:
FIG. 2 is an image of an exemplary structured mask pattern (SMP)

One example of a structured mask pattern is shown in FIG. 2. This pattern is illuminated by a light source and an illumination aperture limits an angle of incidence onto the structured mask. The optical system between the structured mask 107 and the wafer plane images the structured mask pattern onto the wafer plane with demagnification. When using a numerical aperture (e.g., 0.9) with nearly diffraction limited optical performance, the structured mask pattern forms a sharp image at wafer plane with one or more well-defined edges. A well-defined edge can form a clear boundary between a directly-illuminated area and a gray field imaging area. For wafer inspection, a gray field imaging area can define an inspection care area. A sharp boundary can void direct light creeping into the intended gray field imaging area and can ensure uniform sensitivity in the care area. The wafer pattern can be modulated by the structured mask pattern brightness across a field of view. By adjusting the first movable focus lens 109, the structured mask 107 can be focused at, above, or below a surface of the wafer 114 (e.g., in the z direction of FIG. 1) depending on a defect depth inside a wafer stack. A wafer image is collected through collection optics onto the 2D imaging camera 102. By adjusting the second movable focus lens 118, the 2D imaging camera 102 can capture a wafer pattern image at, above, or below a surface of the wafer 114. Whether the focus is at, above, or below the surface of the wafer can depend on the type or wafer of imaging application.

Using an actuator (not illustrated), the structured mask 107 can be translated into and out of the beam of light 104 and/or tilted relative to the beam of light 104 as shown in FIG. 1.

Turning back to FIG. 1, a processor 103 is in electronic communication with the 2D imaging camera 102. The processor 103 is configured to identify defects in the gray field image from the 2D imaging camera 102.

Figure 3:
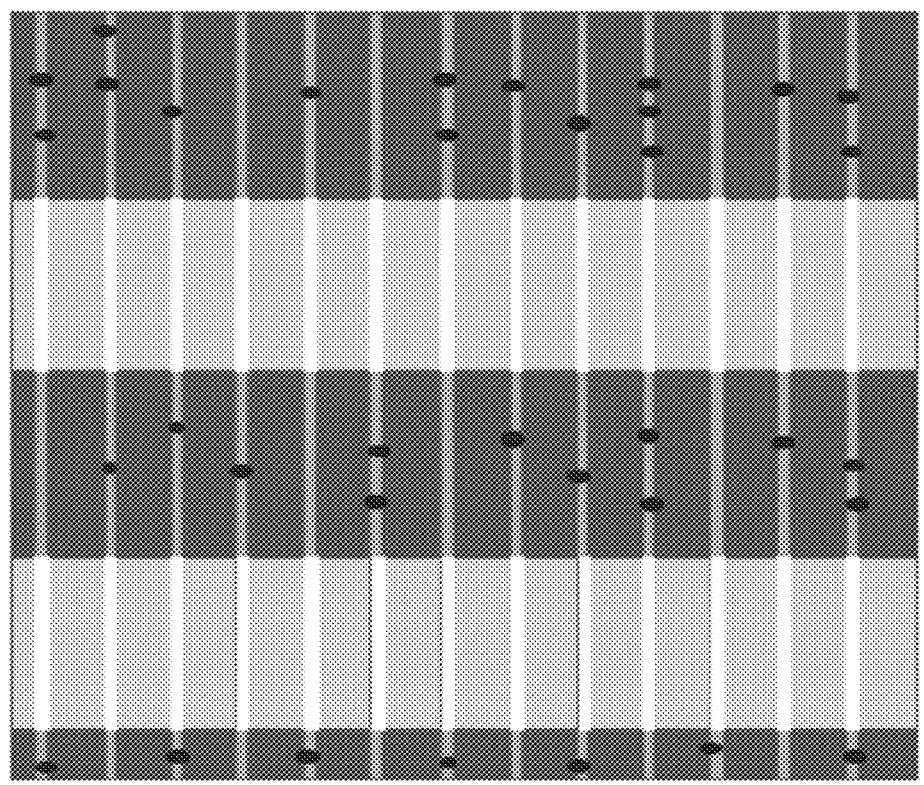
FIG. 3 is an example of a gray field image using the structured mask pattern of FIG. 2.

FIG. 3 is an example of a gray field image using the structured mask of FIG. 2 when the wafer is a mirror surface. The structured mask pattern of FIG. 2 is a 2D binary grating. Light is blocked in a dark zone and transmitted in a bright zone. The structured mask pattern in FIG. 3 modulates the wafer pattern brightness, which are the thin vertical bright lines. The wafer pattern has a 3D structure. The dark zone from FIG. 2 becomes a gray zone and black dots (defects) are apparent. It is more difficult to distinguish black dots in the bright zone. The bright zones have no observable defect signal in FIG. 3, which may be overwhelmed by strong specular reflection from wafer surface.

In FIG. 3, light in the bright zone can leak into the dark zone for a 3D wafer structure through diffraction, secondary reflection from a bottom surface, or other optical interactions inside a stack. The amount of light that leaks can depend on the wafer, the illumination wavelength, the shape and dimension of the apertures in the structured mask, or other parameters. Dark zones appear as gray and appear as if they were back-lit. Thus, the structured mask regions between the apertures become gray. With light leaking into a dark zone from a bright zone, there may be no specular light and the defect signal becomes apparent. The gray field imaging mechanism can be achieved by directly illuminating area next to region of interest for defect detection. A wafer's 3D structure can make the region of interest appear as gray. Defects buried inside a stack or close to a stack surface can become more apparent than a directly-illuminated area.

The wafer 114 can be scanned with respect to the beam of light 104 so that some or all of a surface of the wafer 114 is imaged. This allows defects to be captured across the surface of the wafer 114.

Figure 4:
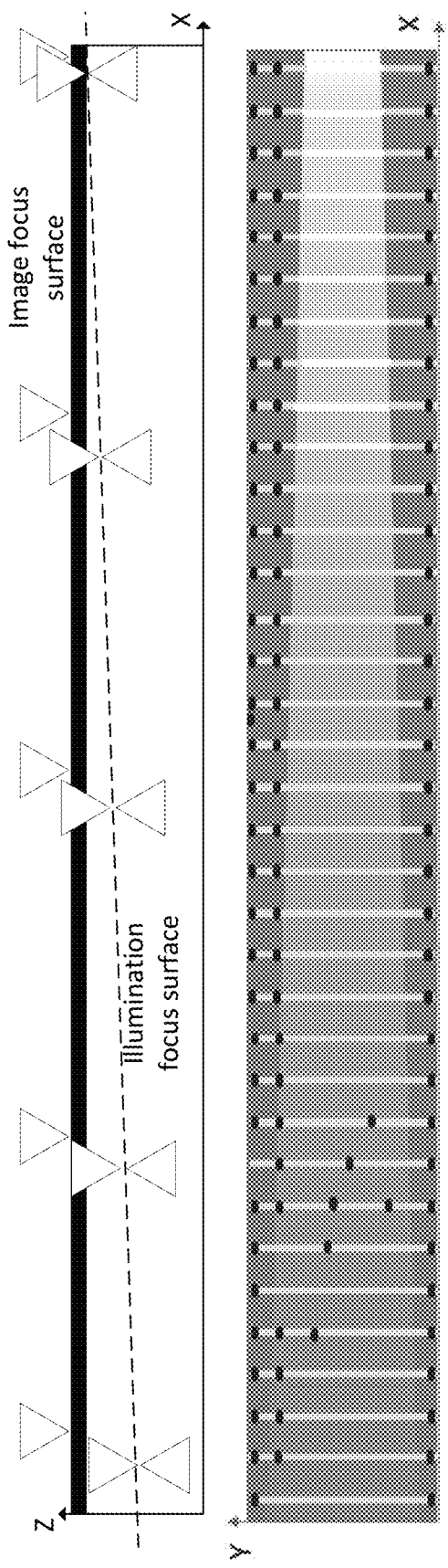
FIG. 4 shows a relationship between illumination focus and collection focus.

Illumination focus and collection focus can be adjusted to provide gray field imaging with or without a structured mask. FIG. 4 shows a relationship between illumination focus and collection focus for the image shown on the bottom.

From right to left on the bottom wafer image, the illumination focus gradually moves into a wafer z stack (e.g., by tilting structured mask 107 in FIG. 1). In the collection path of FIG. 1, both the wafer plane and camera plane are normal to optical axis. A boundary of the structured mask pattern becomes fuzzier from right to left. Also note that wafer pattern (vertical lines) sharpness and defect visibility at bright zone increases from right to left as illumination focus gradually moves below wafer surface. If it were a conventional bright field flood illumination wafer inspection illumination scheme, wafer pattern sharpness would have been uniform from left to right.

The range of angles used when tilting the structured mask 107 can depend on the application. In one example, the structured mask can be tilted so that a defocus range is approximately 10-20 depth of focus, which may be equivalent to 0.3-0.5 degree at a wafer plane.

While the embodiment of FIG. 4 tilts the structured mask, the structured mask 107 also can be removed from the path of the beam of light 104.

This arrangement allows for independent focus adjustment of the illumination conjugate (structured mask to wafer) and collection conjugate (wafer to 2D imaging camera). When using a high numerical aperture and diffraction-limited illumination optics, the illumination pattern on the wafer has a narrow depth of focus and, consequently, the illumination light intensity z distribution inside a wafer can be narrower compared to a conventional non-diffraction limited illumination optics. This will help confine the illumination light intensity z distribution of the wafer stack being illuminated. By shifting an illumination focus below a wafer surface, the intensity of surface reflection can be reduced. The image path focus can be independently adjusted to achieve either improved pattern sharpness or improved defect signal. FIG. 4 shows that illumination focus gradually moves below wafer surface from right to left (by tilting the structured mask pattern).

Wafer plane and camera plane may not be normal to optical axis. Using traditional illumination where optical performance is not diffraction limited, the whole image plane should have the same wafer pattern sharpness. However, in this image, only one X position forms a sharp focus at camera. In other words, z position of the illumination focus can modulate image sharpness. By adjusting illumination focus below a wafer surface and imaging a path focus at a wafer surface, specular reflection from surface pattern can be reduced and a defect near the surface can become more apparent.

In an instance, by adjusting illumination optics' numerical aperture, size, shape, and/or polarization, the gray zone's back-lit z-depth can be optimized. The field distribution inside a wafer stack can change. Hence, defects at different depth can be selectively enhanced.

The wavelength, illumination angle, or other parameters of the light can vary depending on the material of the wafer 114. For example, the wavelength may be changed for polysilicon structures compared to crystalline silicon or silicon oxide. Illumination angle may affect certain materials more than wavelength in some instances.

Turning back to FIG. 1, the system 100 is provided herein to generally illustrate a configuration that may be included in the system embodiments described herein or that may generate optical based output that is used by the system embodiments described herein. The system 100 configuration described herein may be altered to optimize the performance of the system 100 as is normally performed when designing a commercial output acquisition system. In addition, the systems described herein may be implemented using an existing system (e.g., by adding functionality described herein to an existing system). For some such systems, the methods described herein may be provided as optional functionality of the system (e.g., in addition to other functionality of the system). Alternatively, the system described herein may be designed as a completely new system.

The processor 103 may be coupled to the components of the system 100 in any suitable manner (e.g., via one or more transmission media, which may include wired and/or wireless transmission media) such that the processor 103 can receive output. The processor 103 may be configured to perform a number of functions using the output. The system 100 can receive instructions or other information from the processor 103. The processor 103 and/or an electronic data storage unit optionally may be in electronic communication with a wafer inspection tool, a wafer metrology tool, or a wafer review tool (not illustrated) to receive additional information or send instructions. For example, the processor 103 and/or the electronic data storage unit can be in electronic communication with a scanning electron microscope (SEM).

The processor 103, other system(s), or other subsystem(s) described herein may be part of various systems, including a personal computer system, image computer, mainframe computer system, workstation, network appliance, internet appliance, or other device. The subsystem(s) or system(s) may also include any suitable processor known in the art, such as a parallel processor. In addition, the subsystem(s) or system(s) may include a platform with high-speed processing and software, either as a standalone or a networked tool.

The processor 103 may be implemented in practice by any combination of hardware, software, and firmware. Also, its functions as described herein may be performed by one unit, or divided up among different components, each of which may be implemented in turn by any combination of hardware, software, and firmware. Program code or instructions for the processor 103 to implement various methods and functions may be stored in readable storage media, such as a memory in the electronic data storage unit or other memory.

If the system 100 includes more than one processor 103, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The processor 103 may be configured to perform a number of functions using the output of the system 100 or other output. For instance, the processor 103 may be configured to send the output to an electronic data storage unit or another storage medium. The processor 103 may be further configured as described herein.

The processor 103 may be configured according to any of the embodiments described herein. The processor 103 also may be configured to perform other functions or additional steps using the output of the system 100 or using images or data from other sources.

Various steps, functions, and/or operations of system 100 and the methods disclosed herein are carried out by one or more of the following: electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random access memory, a magnetic or optical disk, a non-volatile memory, a solid state memory, a magnetic tape, and the like. A carrier medium may include a transmission medium such as a wire, cable, or wireless transmission link. For instance, the various steps described throughout the present disclosure may be carried out by a single processor 103 or, alternatively, multiple processors 103. Moreover, different subsystems of the system 100 may include one or more computing or logic systems. Therefore, the above description should not be interpreted as a limitation on the present disclosure but merely an illustration.

Figure 5:
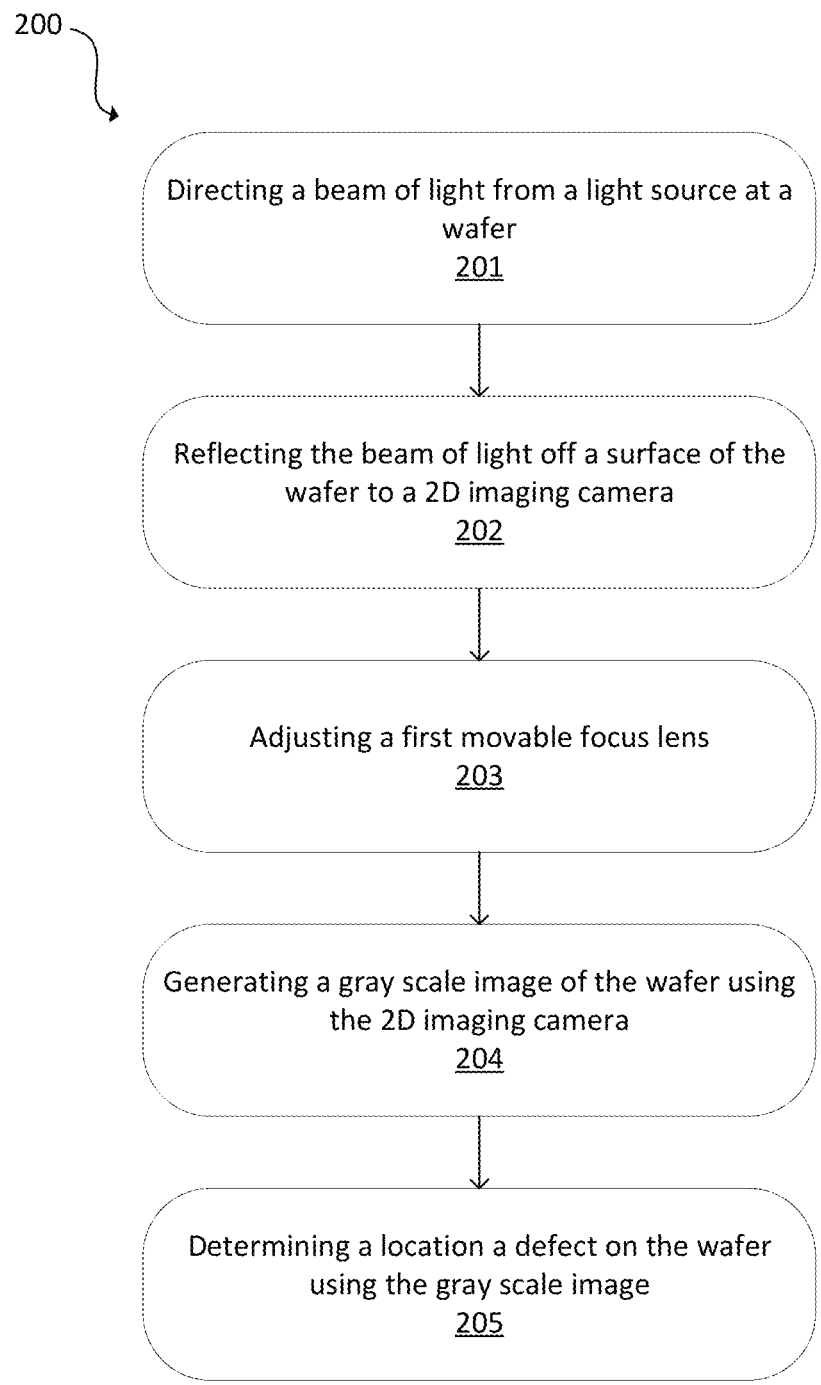
FIG. 5 is an embodiment of a flowchart of a method in accordance with the present disclosure.

FIG. 5 is an embodiment of a flowchart of a method 200. A beam of light is directed from a light source to a wafer on a chuck at 201. The beam of light is reflected off the wafer toward a 2D imaging camera at 202. The focus of the beam of light can be below the surface of the wafer, but also can be above or at the surface of the wafer. The focus can change in depth as the beam of light scans across the surface of the wafer.

A first movable focus lens and a second movable focus lens can be adjusted at 203. The first movable focus lens is disposed in a path of the beam of light between the light source and the wafer. The second movable focus lens is disposed between the wafer and the 2D imaging camera. The adjusting includes independent changes to an illumination conjugate and a collection conjugate.

The adjusting can include changing a position of the first movable focus lens such that the structure mask is focused and light in the bright zones leaks into the dark zones.

An image of the wafer is generated using the 2D imaging camera at 204. The image is a gray field image. A location of a defect on the wafer using the image is determined at 205. This determination can use a processor, such as the processor 103 of FIG. 1. The processor can determine the location of a defect in the image using, for example, differences in the various pixels. The processor can compare a pixel against neighboring pixels to determine if a defect is present.

The beam of light can be directed through a structured mask disposed in the path of the beam of light between the light source and the first moveable relay lens. The structured mask defines a plurality of apertures. The apertures form bright zones on the surface of the wafer and regions of the structured mask between the apertures form dark zones on the surface of the wafer, which becomes a gray zone in a collection path after interacting with a 3D structure on the wafer.

Turning back to FIG. 1, the processor 103 is in communication with the system 100. The processor 103 can be configured to perform or send instructions for some or all of the steps of method 200.

An additional embodiment relates to a non-transitory computer-readable medium storing program instructions executable on a controller for performing a computer-implemented method, as disclosed herein. An electronic data storage unit or other storage medium may contain non-transitory computer-readable medium that includes program instructions executable on the processor 103. The computer-implemented method may include any step(s) of any method(s) described herein, including method 200.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes (MFC), Streaming SIMD Extension (SSE), or other technologies or methodologies, as desired.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:
1. A system comprising:
a light source that generates a beam of light;
an objective;
a chuck configured to hold a wafer in a path of the beam of light that passes through the objective;
a relay lens disposed in the path of the beam of light between the light source and the objective;
a tunable illumination aperture disposed in the path of the beam of light between the light source and the relay lens;
a first tube lens disposed in the path of the beam of light between the relay lens and the objective;

a first movable focus lens disposed in the path of the beam of light between the first tube lens and the relay lens;

a 2D imaging camera configured to receive light reflected from the wafer through the objective;

a second movable focus lens disposed in the path of the beam of light between the objective and the 2D imaging camera; and a second tube lens disposed in the path of the beam of light between the second movable focus lens and the objective, wherein the first movable focus lens and the second movable focus lens are configured to be movable along the path of the beam of light to adjust an illumination conjugate between the light source and the wafer and a collection conjugate between the wafer and the 2D imaging camera, and wherein the first movable focus lens and the second movable focus lens are configured to position an illumination focus at, above, or below a surface of the wafer; and wherein the 2D imaging camera is configured to generate a gray field image of the wafer.

2. The system of claim 1, further comprising a structured mask disposed in the path of the beam of light between the light source and the objective, wherein the structured mask defines a plurality of apertures that the beam of light passes through, and wherein a portion of the beam of light is blocked by the structured mask.

3. The system of claim 2, wherein the structured mask is disposed between the light source and the first movable focus lens.

4. The system of claim 3, wherein the structured mask is disposed between the relay lens and the first movable focus lens.

5. The system of claim 2, wherein the structured mask is configured to tilt relative to the path of the beam of light.

6. The system of claim 1, wherein an illumination numerical aperture of the system is from 0 to 0.9.

7. The system of claim 1, wherein a collection path numerical aperture of the system is at least 0.9.

8. The system of claim 1, further comprising a processor in electronic communication with the 2D imaging camera, wherein the processor is configured to identify defects in the gray field image from the 2D imaging camera.

9. A method comprising:
directing a beam of light from a light source at a wafer on a chuck;
reflecting the beam of light off the wafer to a 2D imaging camera;
adjusting a first movable focus lens disposed in a path of the beam of light between the light source and the wafer and a second movable focus lens disposed between the wafer and the 2D imaging camera, wherein the adjusting includes independent changes to an illumination conjugate between the light source and the wafer and a collection conjugate between the wafer and the 2D imaging camera;
generating an image of the wafer using the 2D imaging camera, wherein the image is a gray field image; and
determining a location of a defect on the wafer using the image.

10. The method of claim 9, wherein a focus of the beam of light is below a surface of the wafer.

11. The method of claim 9, wherein a focus of the beam of light is at a surface of the wafer.

12. The method of claim 9, wherein a focus of the beam of light is above a surface of the wafer.

13. The method of claim 9, wherein a focus of the beam of light changes in depth as the beam of light scans across a surface of the wafer.

14. The method of claim 9, further comprising directing the beam of light through a structured mask disposed in the path of the beam of light between the light source and the first moveable relay lens, wherein the structured mask defines a plurality of apertures, and wherein the plurality of apertures form bright zones on a surface of the wafer and regions of the structured mask between the apertures form dark zones on the surface of the wafer.

15. The method of claim 14, wherein the adjusting includes changing a position of the first movable focus lens such that the structured mask is focused and light in the bright zones leaks into the dark zones.

16. The method of claim 9, wherein an illumination numerical aperture is from 0 to 0.9.

17. The method of claim 9, wherein a collection path numerical aperture is at least 0.9.

18. The method of claim 9, wherein the wafer includes a 3D structure.

* * * * *